Figure 1:
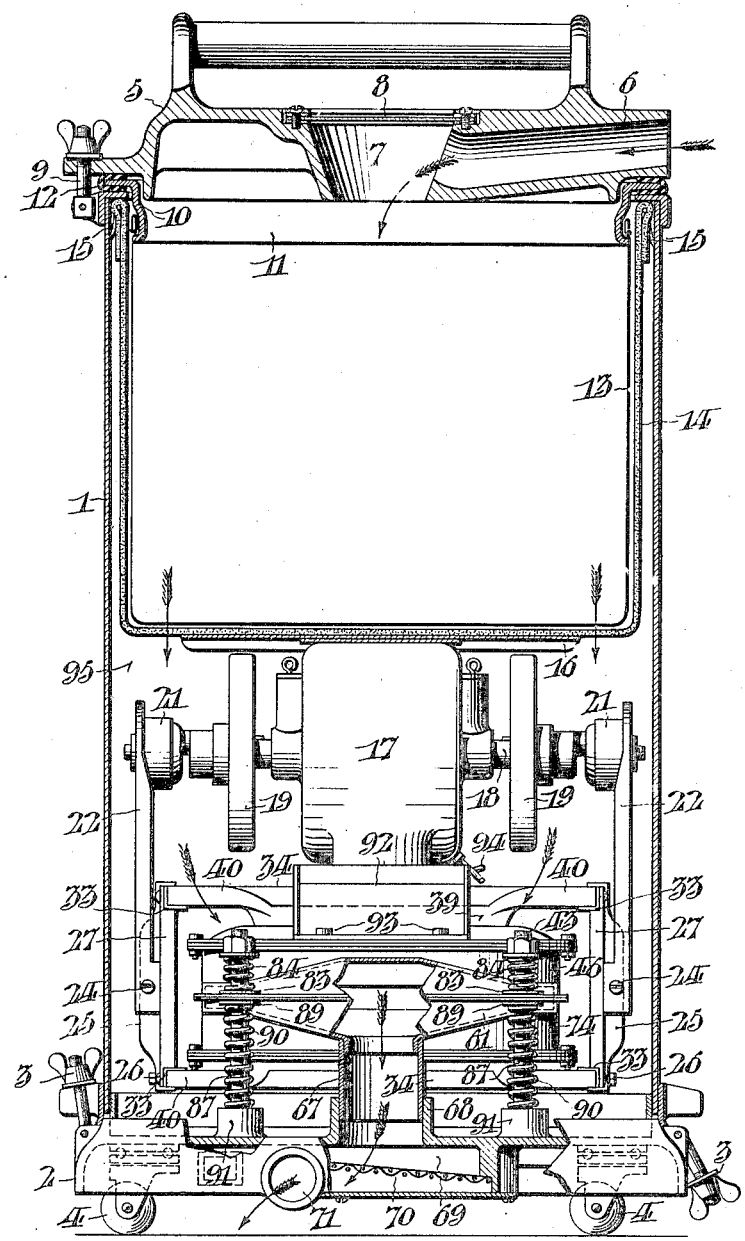

J. H. TEMPLIN.
DUPLEX PUMPING APPARATUS.
APPLICATION FILED MAR. 27, 1912.

1,206,615.

Patented Nov. 28, 1916.
6 SHEETS—SHEET 1.

Inventor
Joseph H Templin
By Maley & Paul
Attorneys

Witnesses
John E Bergner
James H Bell

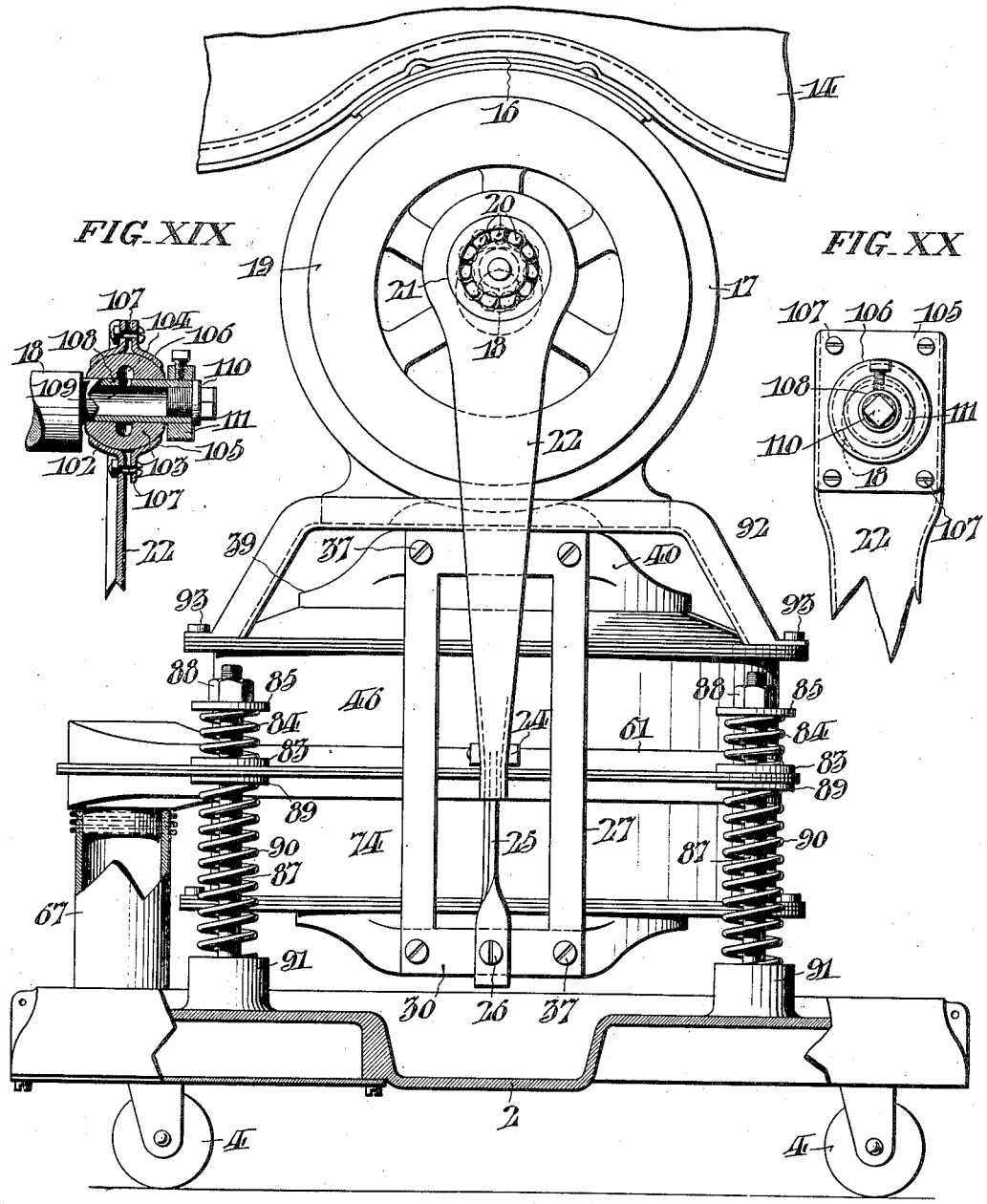

J. H. TEMPLIN.
DUPLEX PUMPING APPARATUS.
APPLICATION FILED MAR. 27, 1912.
1,206,615.
Patented Nov. 28, 1916.
6 SHEETS—SHEET 3.
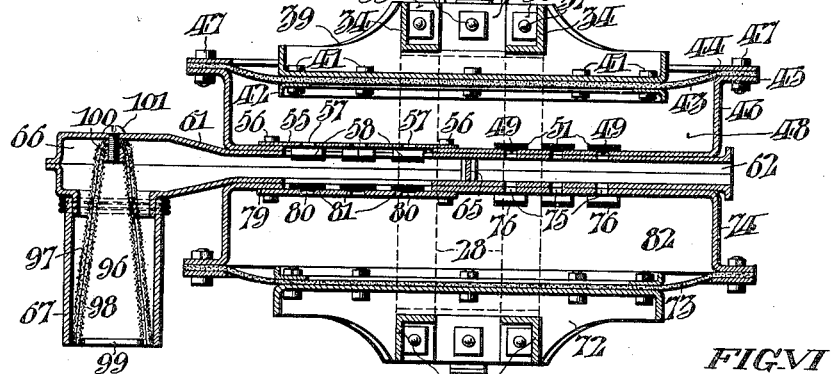
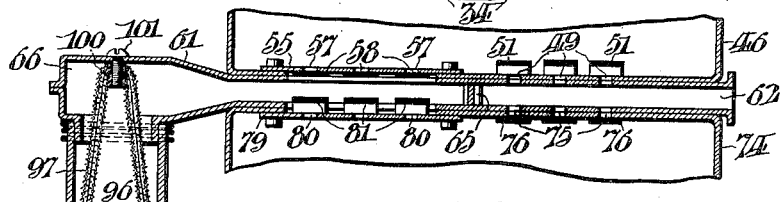
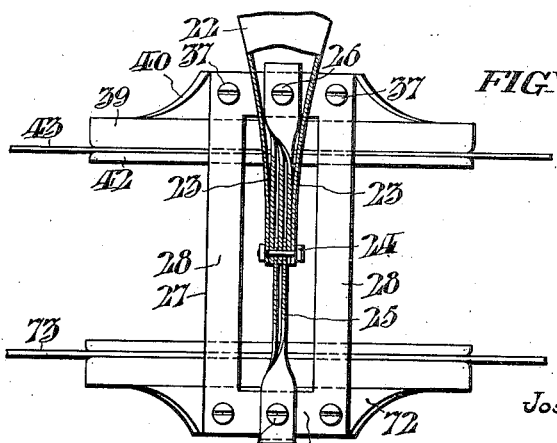
Inventor
Joseph H Templin
Witnesses J. H. TEMPLIN.
DUPLEX PUMPING APPARATUS.
APPLICATION FILED MAR. 27, 1912.
1,206,615.
Patented Nov. 28, 1916.
6 SHEETS—SHEET 4.
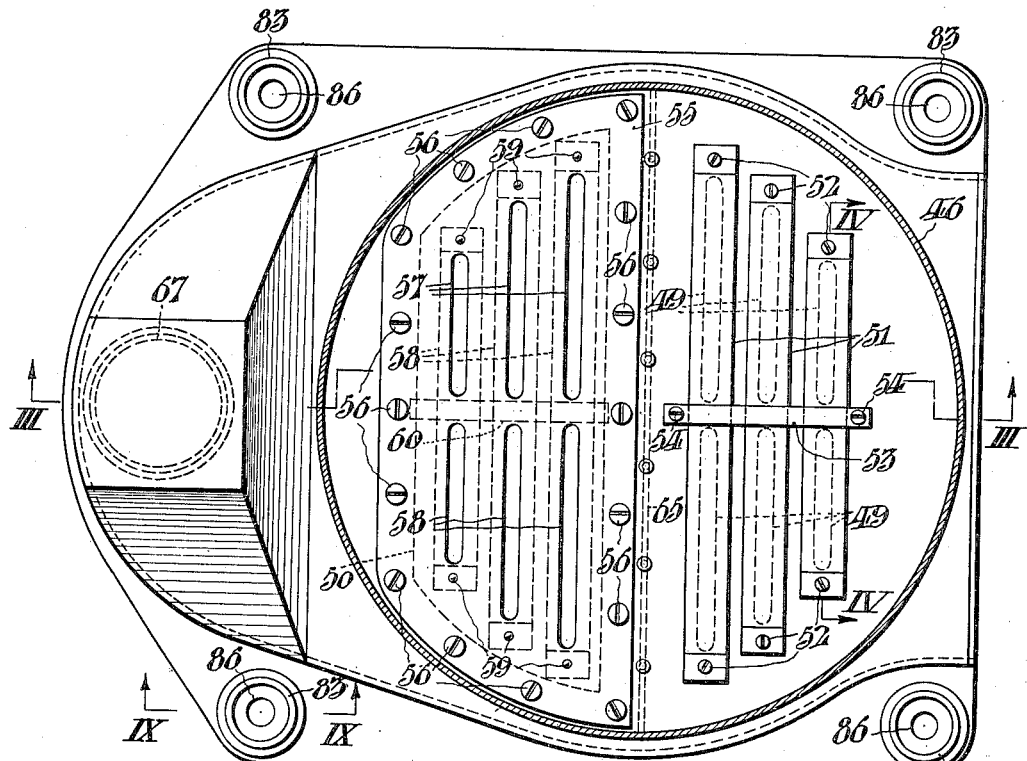
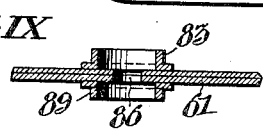
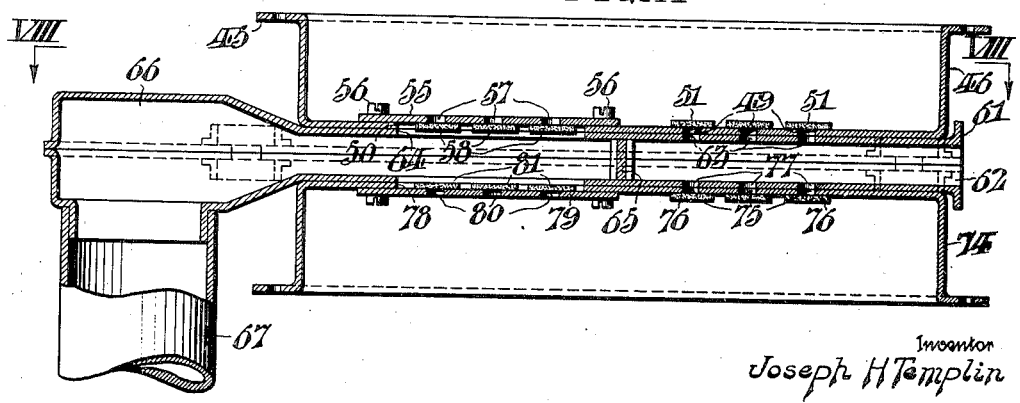
Witnesses
John C. Bergner
James H. Bell
Inventor
Joseph H Templin
By Raley & Paul
Attorneys

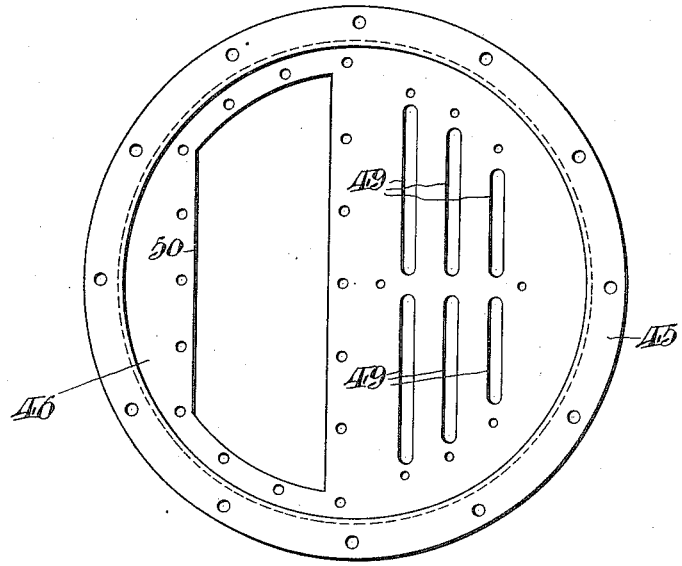
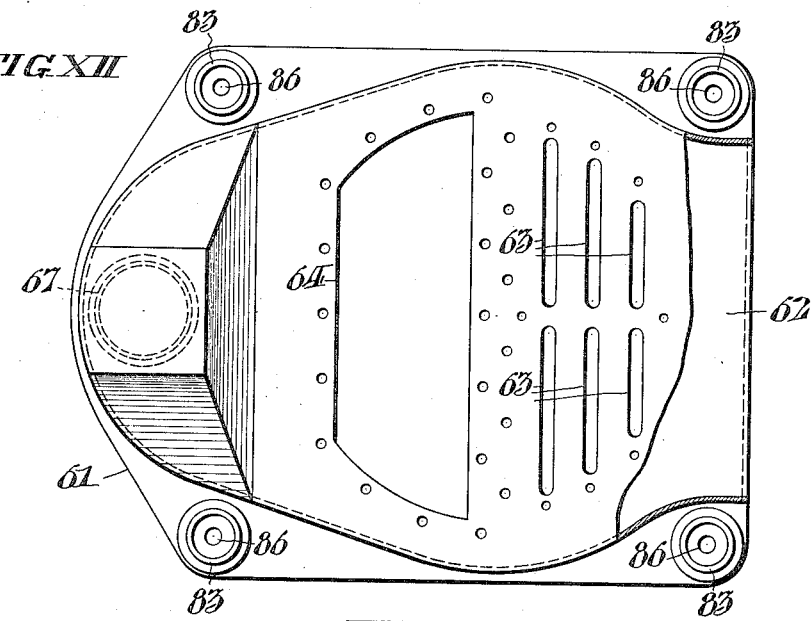
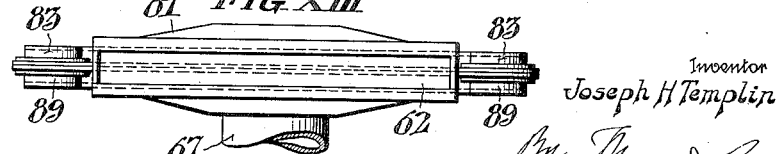

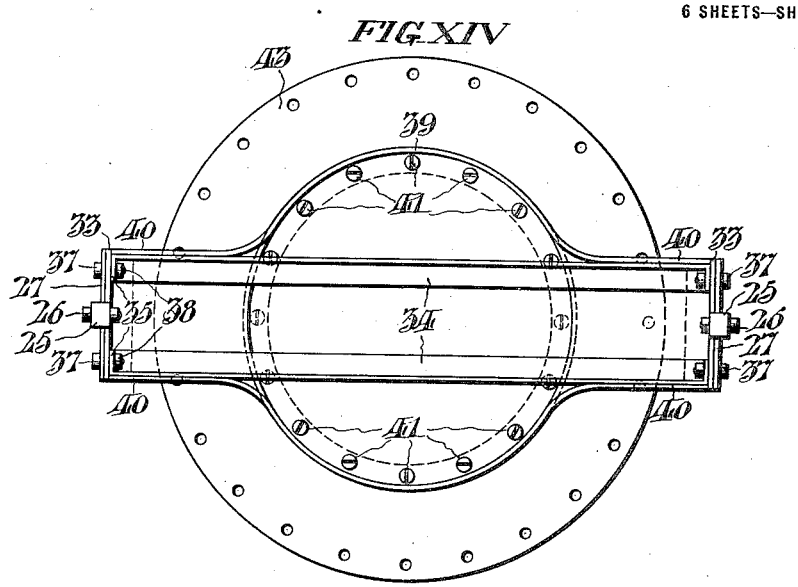
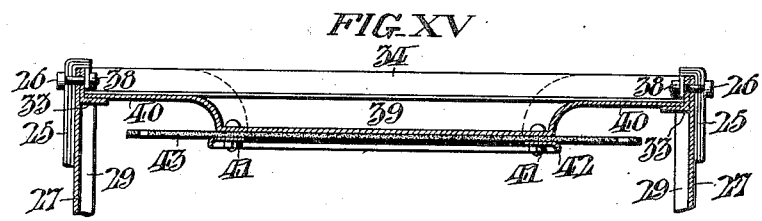
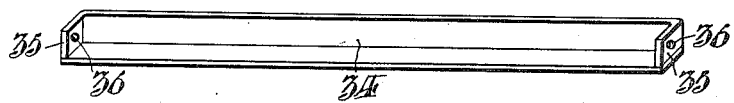
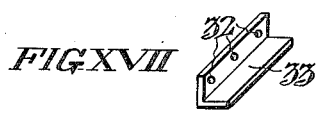
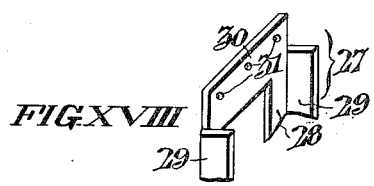

UNITED STATES PATENT OFFICE.

JOSEPH H. TEMPLIN, OF PHILADELPHIA, PENNSYLVANIA, ASSIGNOR, BY MESNE ASSIGNMENTS, TO GENERAL ELECTRIC COMPANY, A CORPORATION OF NEW YORK.

DUPLEX PUMPING APPARATUS.

1,206,615.  Specification of Letters Patent.  Patented Nov. 28, 1916.

Application filed March 27, 1912. Serial No. 686,468.

*To all whom it may concern:*

Be it known that I, JOSEPH H. TEMPLIN, a citizen of the United States, and a resident of Philadelphia, in the county of Philadelphia and State of Pennsylvania, have invented certain new and useful Improvements in Duplex Pumping Apparatus, whereof the following is a specification, reference being had to the accompanying drawings.

One of the main objects of my present invention is to devise a novel pumping apparatus of the reciprocating type which is adapted to maintain a substantially constant suction thereby enabling me to eliminate the intermittent pumping action which takes place in reciprocating types of pumps.

Another object of my invention is to devise a novel construction of a duplex pumping apparatus having a novel construction and arrangement of valve mechanism and wherein all of the working parts are preferably located within the vacuum chamber of the device.

These and other objects will in part be obvious, and will in part be hereinafter more fully disclosed.

In the drawings which show by way of illustration one embodiment of the invention, Figure I, represents a sectional elevation of a vacuum cleaner in conjunction with which a duplex pumping apparatus embodying my invention is employed. Fig. II, represents a side elevation, partly in section, of a portion of Fig. I. Fig. III, represents a section on the line III, III, in Fig. VIII, showing more particularly the pumping mechanism and one of the connecting rods. Fig. IV, represents a section on the line IV, IV, in Fig. VIII. Fig. V, represents a sectional elevation similar to Fig. IV, but showing the parts in different relation from that seen in Fig. IV. Fig. VI, represents a sectional elevation showing certain of the parts seen in Fig. III, but in a different relation. Fig. VII, represents a side elevation partly in section, showing more particularly the manner of securing the connecting rods to the followers. Fig. VIII, represents a sectional plan view on the line VIII, VIII, in Fig. X. Fig. IX, represents a section on the line IX, IX, in Fig. VIII. Fig. X, represents a section on the line III, III, in Fig. VIII, on an enlarged scale. Fig. XI, represents a sectional plan view of one of the pump casing members. Fig. XII, represents a plan view, partly in section, of the casing of the other pump member. Fig. XIII, represents a side elevation of Fig. XII. Fig. XIV, represents a sectional plan view of a portion of the device showing more particularly the manner of connecting a follower with the yoke to which the connecting rods are secured. Fig. XV, represents a sectional elevation of Fig. XIV. Fig. XVI, represents a perspective view of one of the angle bars seen in Figs. XIV, and XV, but in detached position. Fig. XVII, represents a perspective view of another angle bar seen in Figs. XIV, and XV. Fig. XVIII, represents a perspective view of the yoke or bracket which is also seen in Figs. II, and VII. Fig. XIX, represents a sectional elevation, and Fig. XX, represents an end elevation of another embodiment of my invention.

Similar numerals of reference indicate corresponding parts in the figures.

The cleaning device consists of an outer casing 1, which is provided with a base 2, detachably secured thereto in air-tight engagement by means of fastening devices 3. Said base is preferably provided with anti-friction rollers 4, whereby the cleaner may be readily moved from place to place. The upper end of the casing is closed by a cover 5, which is formed with an inlet 6, leading to an observation chamber 7. A sight glass 8, is removably secured to the cover, and closes said observation chamber. The cover is secured in air-tight engagement with the casing by fastenings 9. The filter support 11, is provided with a flange 10, and a U-shaped gasket 12, engages the flange and lies between the cover and the top of the casing, whereby an air-tight connection is formed.

The filtering member 13, is secured to the support 11, in any desired manner, and said filtering material is surrounded by an outer filtering device 14, the upper end of which is supported on hooks 15, carried by the casing 1. The lower end of the outer filtering device 14, rests on a guard 16, carried by the casing of the motor 17. The shaft 18, of the motor carries counterbalance members 19, one of which is located at each end of the shaft. Mounted on the outer ends of the shaft are crank pins which engage balls 20. These balls coöperate with hubs 21, on the connecting rods, or pitmen 22. Said pitmen are provided with laterally extending flanges 23, in order to strengthen the same. These pitmen 22, are preferably of varying diameter throughout their length, and at their lower ends are secured by means of suitable fastening devices 24, to the spring members 25. The spring members 25, are formed of a plurality of thin metal strips, the ends of which are deflected at an angle to the body portion, and are secured by fastening devices 26, to a yoke or bracket 27, (see Fig. VII). The fastening device 24, passes through the flanges 23, and said metal strips of the members 25. The bracket 27, consists of bars 28, (see Figs. VII, XVIII), having laterally extending flanges 29, the ends of which terminate a desired distance from the ends of the transverse connecting portions 30. These connecting portions 30, are formed with apertures 31, which register with the apertures 32, in the angle bars 33, which are adapted to be seated on the ends of the flanges 29, (see Fig. XV). The angle bars 33, are connected by angle bars 34. One side of each angle bar 34, is made longer than the other, as indicated at 35, and said portion 35, is bent so as to extend along the end of the other portion of the angle bar. The portions 35, are apertured as at 36, so as to receive bolts 37, which pass through the apertures 31, and 32, and nuts 38, are threaded on the bolts.

The follower proper 39, which in the present instance, is pan-shaped and provided with laterally extending arms 40, which rest on the laterally extending sides of the angle members 33, and the laterally extending members of the angle bars 34, rest on the upper face of the arms 40. The follower 39, will thereby be maintained in assembled position with respect to the bracket 27. The follower 39, is attached to a diaphragm 43, by suitable fastening devices 41, and a coöperating washer 42. The outer edge of the diaphragm 43, is secured between a washer 44, and the laterally extending flange 45, of the upper or inner pump casing member 46. Fastening devices 47, secure the washer 44, to the flange 45, (see Fig. III.)

The pump 46, is constructed in such a manner that the pumping chamber 48, has an enlarged clearance. The lower portion of the pumping chamber 48, is provided on one side of its diameter with two series of slots 49, (see Fig. XI). In the present embodiment of the invention, the opposite side of said lower portion of the pump chamber, is cut away as indicated at 50. The valve members 51, have their ends secured to the casing 46, as indicated at 52. Intermediate the ends of the valves 51, is a transverse bar or stop 53, the ends of which are secured by fastening devices 54, to the casing 46. This bar limits the amount of opening of the valve members 51. The aperture 50, is covered by a plate 55, which is secured to the casing 46, by fastening devices 56, (see Figs. III, and VIII.) Said plate has a plurality of outlet apertures or slots 57, which are constructed in a similar manner to the inlet ports 49, and these apertures 57, are controlled by valve members 58, secured to the plate by fastening devices 59, see Fig. VIII. A transverse stop member 60, limits the movement of the valve members 58, in the same manner as the stop member 53, coöperates with the valves 51.

The casing 46, is mounted on an intermediate casing 61, which is preferably constructed in sections, and provided with a rectangular opening 62, of comparatively large area as indicated in Figs. XII and XIII. The intermediate casing 61, is formed with inlet ports 63, which communicate with the inlet ports 49, in the casing 46, and is also provided with an opening 64, corresponding and registering with the opening 50, in the casing 46. A partition 65, separates the inlet 62, from the outlet 66, of the intermediate casing 61. A flexible or other suitable conduit 67, is connected with an annulus 68, carried by the base 2. This conduit discharges into a chamber 69, in the base, wherein is located a muffler 70, which may be of any desired type. The air after leaving the muffler, passes to the atmosphere or other desired point of utilization, through an exhaust port 71, which may be connected in any desired manner with a suitable nozzle for this purpose.

The lower follower 72, of the pump is secured to the brackets 27, in a manner similar to that already described in connection with the follower 39, and it will not be necessary therefore, to describe this construction in further detail. The lower or outer diaphragm 73, is secured to the lower casing 74, in a manner similar to that of securing the diaphragm 43, to the casing 46. The lower casing 74, conforms in construction with that of the upper casing 46. This lower casing 74, is provided with inlet ports 75, controlled by valves 76. Said ports 75, register with inlet ports 77, which communicate with the main fluid inlet 62. The casing 74, is apertured as at 78, and said aperture is closed by a plate 79, secured to the casing 74. This plate 79, is formed with outlet ports 80, controlled by valves 81, so that the air discharged from the pump chamber 82, into the casing 74, and to the outlet 66, may be properly controlled.

It will be understood that the construction of the pump casing and the valve mechanism is therefore similar in each case. The upper side of the intermediate casing 61, is formed with a plurality of collars 83, which form seats for one end of springs 84, see Fig. II. The other ends of the springs abut against washers 85, carried by rods 87.

These rods pass through apertures 86, in the intermediate casing 61, which apertures are so constructed that the casing may move freely on the rods. Nuts 88, engage the outer ends of the rods. These rods are seated in bosses 91, carried by the main base of the cleaner. Surrounding the apertures 86, on the under side of the intermediate casing are collars 89, which form seats for the springs 90, also surrounding the rods 87, and resting at their lower ends on the bosses, 91.

The motor casing is provided with standards 92, which are secured to the upper casing member 46, by means of fastening devices 93. It will therefore, be seen that the entire pumping mechanism including the actuating motor, is yieldingly supported within the vacuum chamber of the cleaner by springs 90, and the springs 84. This yielding mounting of the vibrating parts eliminates practically all the vibrations which are ordinarily present in devices of this character, especially where a rapid reciprocating pumping element is employed. The motor 17, is connected by means of a conductor 94, with a suitable source of electric supply.

In Figs. III, and VI, I have shown an additional means for muffling the fluid passing through the outlet 67. This means consists of a dome-shaped bag of fabric 96, such as felt, which has on opposite sides thereof, layers of wire gauze of equivalent material 97, and 98. An annulus 99, carried by the lower end of the muffler fastens the side thereof to the inner walls of the conduit, while the upper end of the muffler is provided with a threaded attachment 100, which is supported from the casing 61, by means of a screw 101. By this supporting means, the muffler may be readily assembled with respect to the casing or removed therefrom.

In Figs. XIX and XX, I have shown a modified form of the invention and in this construction, the pitmen are engaged in a different manner by the crank pins. The outer end of the pitman 22, is deflected to form a hemispherical seat 102, for a ball 103, which latter is internally grooved as shown at 104. A plate 105, is shaped to form a hemispherical seat 106, for the ball 103. This plate 105, is secured to the pitman by suitable devices 107, and the ball is held between said pitman and said plate. The crank pin 108, is hollow, and passes centrally through the ball 103. This crank pin is provided with an aperture 109, whereby lubricant within the crank pin may pass to the central groove 104, of the ball. The end of the hollow crank pin is closed by a threaded plug 110. A collar 111, is secured to the outer end of the crank pin and limits the movement of the ball 103, on the crank pin.

The operation of my device is as follows: The rotation of the motor shaft 18, will impart a reciprocating movement to the connecting rods or pitmen 22, thereby reciprocating the brackets or yokes 27, and the followers 39, and 72. The said followers 39, and 72, are connected with respect to the pitmen 22, in such a manner that while the fluid is being drawn into one pumping chamber it is being discharged from the other pumping chamber, whereby I am enabled to obtain a practically continuous flow of fluid from the pump and maintain a substantially constant vacuum in the vacuum chamber 95. Assuming now that the follower 39, is moved downward as indicated in Fig. III, dust laden air will be drawn through the inlet 6, into the observation chamber 7, thence into the vacuum chamber 95, wherein are located the filtering devices 13, and 14, and passing through these devices the impurities and foreign material contained in the dust laden air will be removed therefrom, and the air in its purified condition will pass into the motive fluid inlet 62, and since the ports 75, are now open, it will be drawn into the pumping chamber 82, which is provided with an enlarged clearance, as already described in connection with the chamber 48. The fluid in the chamber 48, since the valves 49, will be closed, will pass through the ports 57, into the outlet 66, and thence through the conduit 67, to the chamber 69, through the muffler 70, and thence through port 71, to a desired point of utilization and on the return stroke of the pitmen 22, the reverse action will take place, and the air or fluid contained in the pumping chamber 82, will discharge through the ports 80, into the outlet 66, and thence, as hereinbefore described, to the atmosphere, it being understood that while air is being discharged from the lower pumping chamber 82, fluid is being admitted to the pumping chamber 48, through the inlet ports 63. It will thus be apparent that when the pitmen 22, are moving in either direction a suction is created at the suction inlet 6, and a substantially continuous suction action is maintained while the pumping mechanism is in operation.

Special attention is directed to the novel manner in which the connecting rods are secured with respect to the brackets 27, since by the employment of one or more slightly resilient members, the desired oscillation and reciprocation of the diaphragms 43, and 73, is permitted at all times. It is further to be noted that owing to the novel manner in which the valve mechanism is constructed and arranged, all of the valves are readily accessible for the purpose of inspection or repair should the same at any time become desirable.

It will now be apparent that I have devised a novel and useful construction of a duplex pumping apparatus, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention, or sacrificing any of its advantages.

Having thus described my invention I claim:

In a device of the character described, the combination of a pumping unit comprising a pair of central spaced walls having flanges on opposite sides which are connected to each other, a partition dividing the space between said walls into a suction chamber and a discharge chamber, a cup-shaped member connected to each of said spaced walls, diaphragms closing the open sides of the cup-shaped members and forming pumping chambers, and suction and discharge valves connecting said suction and discharge chambers to the pumping chambers; a motor mounted on the pumping unit, means operatively connecting the motor to the diaphragms to actuate them, a casing having an inlet and an outlet, rods in the casing, springs on said rods, said pumping unit and motor being mounted on said rods between said springs so that it is resiliently supported in each direction, said rods passing through the flanges of the central spaced walls, and a flexible conduit connecting the discharge chamber of the pumping unit to the outlet in the casing.

In testimony whereof, I have hereunto signed my name at Philadelphia, Pennsylvania, this fifteenth day of March, 1912.

JOSEPH H. TEMPLIN.

Witnesses:
  JAMES H. BELL,
  E. L. FULLERTON.